US008033377B2

(12) United States Patent
Reimer et al.

(10) Patent No.: US 8,033,377 B2
(45) Date of Patent: Oct. 11, 2011

(54) FOLDING UNLOADING AUGER ENGAGEMENT ASSISTORS

(75) Inventors: Mark Jeffery Reimer, Coralville, IA (US); Ronald Wade Nelson, Geneseo, IL (US); Brian James Tank, East Moline, IL (US); Stephen James VanWynsberghe, Cambridge, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/271,694

(22) Filed: Nov. 10, 2005

(65) Prior Publication Data

US 2007/0102260 A1 May 10, 2007

(51) Int. Cl.
*B65G 21/14* (2006.01)

(52) U.S. Cl. ......................... 198/313; 198/314; 198/668

(58) Field of Classification Search .................. 198/313, 198/314

See application file for complete search history.

(56) References Cited

U.S. PATENT DOCUMENTS

| | | | | |
|---|---|---|---|---|
| 4,391,363 | A * | 7/1983 | Waldrop | 198/861.5 |
| 5,013,206 | A * | 5/1991 | Ernst et al. | 414/483 |
| 5,013,208 | A * | 5/1991 | Grieshop | 414/526 |
| 5,100,281 | A * | 3/1992 | Grieshop | 414/526 |
| 5,409,344 | A * | 4/1995 | Tharaldson | 414/505 |
| 5,584,640 | A * | 12/1996 | Johnson | 414/502 |
| 5,695,398 | A | 12/1997 | Carlson et al. | 460/114 |
| 5,695,399 | A | 12/1997 | Carlson et al. | 460/114 |
| 6,017,182 | A * | 1/2000 | Grieshop | 414/526 |
| 6,247,886 | B1 | 6/2001 | Signer et al. | 414/523 |
| 6,422,376 | B1 * | 7/2002 | Nichols et al. | 198/668 |
| 6,767,174 | B2 * | 7/2004 | Cresswell | 414/523 |

* cited by examiner

*Primary Examiner* — Gene O. Crawford
*Assistant Examiner* — Kavel Singh
(74) *Attorney, Agent, or Firm* — Taylor IP, PC

(57) ABSTRACT

An unloading auger for an agricultural harvester includes an inner auger having an outer end and a first coupler at the outer end. The first coupler includes a first engagement cog. An outer auger is pivotally attached to the outer end of the inner auger. The outer auger has an inner end and a second coupler at the inner end. The second coupler includes a second engagement cog. The first coupler or second coupler includes at least one engagement assistor configured to rotate the outer auger prior to engagement between the first engagement cog and the second engagement cog.

14 Claims, 4 Drawing Sheets

32
34
36
44
40
46

40
44
36
46
34
32

FOLDING UNLOADING AUGER ENGAGEMENT ASSISTORS

FIELD OF THE INVENTION

The present invention relates to agricultural harvesters, and, more particularly, to folding unloading augers in such harvesters.

BACKGROUND OF THE INVENTION

An agricultural harvester such as a combine includes a head and a feeder housing which remove the crop material from the field, gather the crop material and transport the crop material to a separator. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular the longitudinal axis of the combine. The combine drives alongside a vehicle into which the grain is to be unloaded, such as a semi-trailer, and the unloading auger is actuated to discharge the grain into the vehicle.

A trend in agricultural machines is for the size of the machines to become larger. One example is the width of the head (such as a bean head) on a combine. Since the combine drives alongside the vehicle into which the grain is to be unloaded, and a larger head means that the body of the combine is a further distance from the vehicle, the length of the auger must also be increased.

It is known to provide a folding unloading auger including an inner auger which folds alongside the combine, and an outer auger which folds around the rear of the combine and rests in a cradle during use. A folding unloading auger prevents the auger from extending an undesirable distance behind the combine when not used during unloading. The outer auger is manually removed from the cradle and moved to the unfolded and engaged position for an unloading operation. The outer auger is locked relative to the inner auger in the unfolded position using a manually operable latch arrangement.

What is needed in the art is a folding unloading auger which can be automatically moved between a folded and unfolded position, is held in the desired position, and positively engages the outer auger at a desired orientation.

SUMMARY OF THE INVENTION

The present invention provides a folding unloading auger with an engagement assembly between the auger sections having a pair of engagement cogs, and one or more engagement assistors for initial rotation of the outer auger.

The invention comprises, in one form thereof, an unloading auger for an agricultural harvester, including an inner auger having an outer end and a first coupler at the outer end. The first coupler includes a first engagement cog. An outer auger is pivotally attached to the outer end of the inner auger. The outer auger has an inner end and a second coupler at the inner end. The second coupler includes a second engagement cog. The first coupler or second coupler includes at least one engagement assistor configured to rotate the outer auger prior to engagement between the first engagement cog and the second engagement cog.

The invention comprises, in another form thereof, a method of operating an unloading auger in an agricultural combine, including the steps of: unfolding an outer auger relative to an inner auger; engaging a cog on a first coupler with an engagement assistor on a second coupler; rotatably driving the outer auger using the cog and the engagement assistor; conveying grain from the inner auger to the outer auger; and rotatably driving the outer auger using the cog on the first coupler and a second cog on the second coupler.

DETAILED DESCRIPTION OF THE INVENTION

Figure 1:
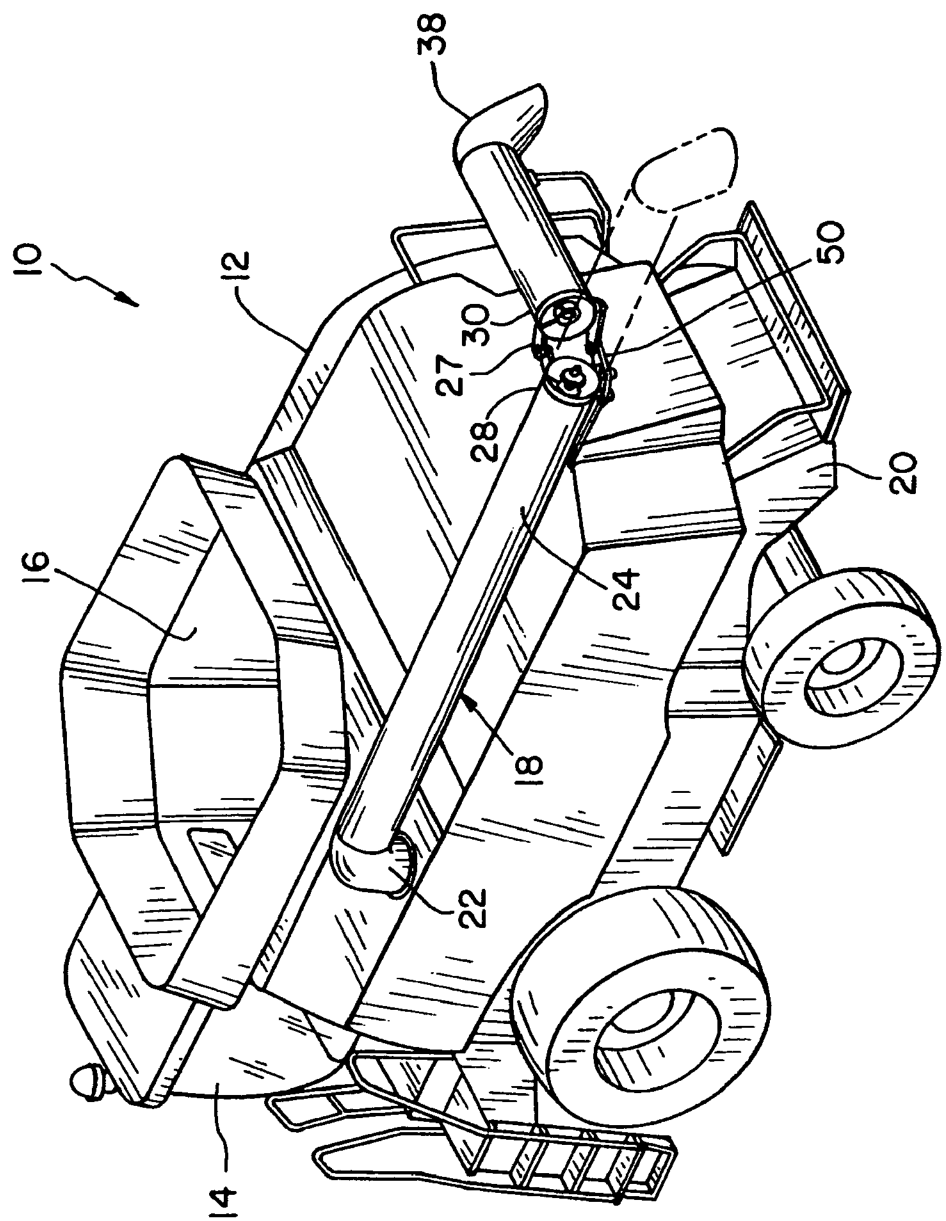
FIG. 1 is a perspective view of an agricultural harvester including an embodiment of a folding unloading auger of the present invention.
Figure 2:
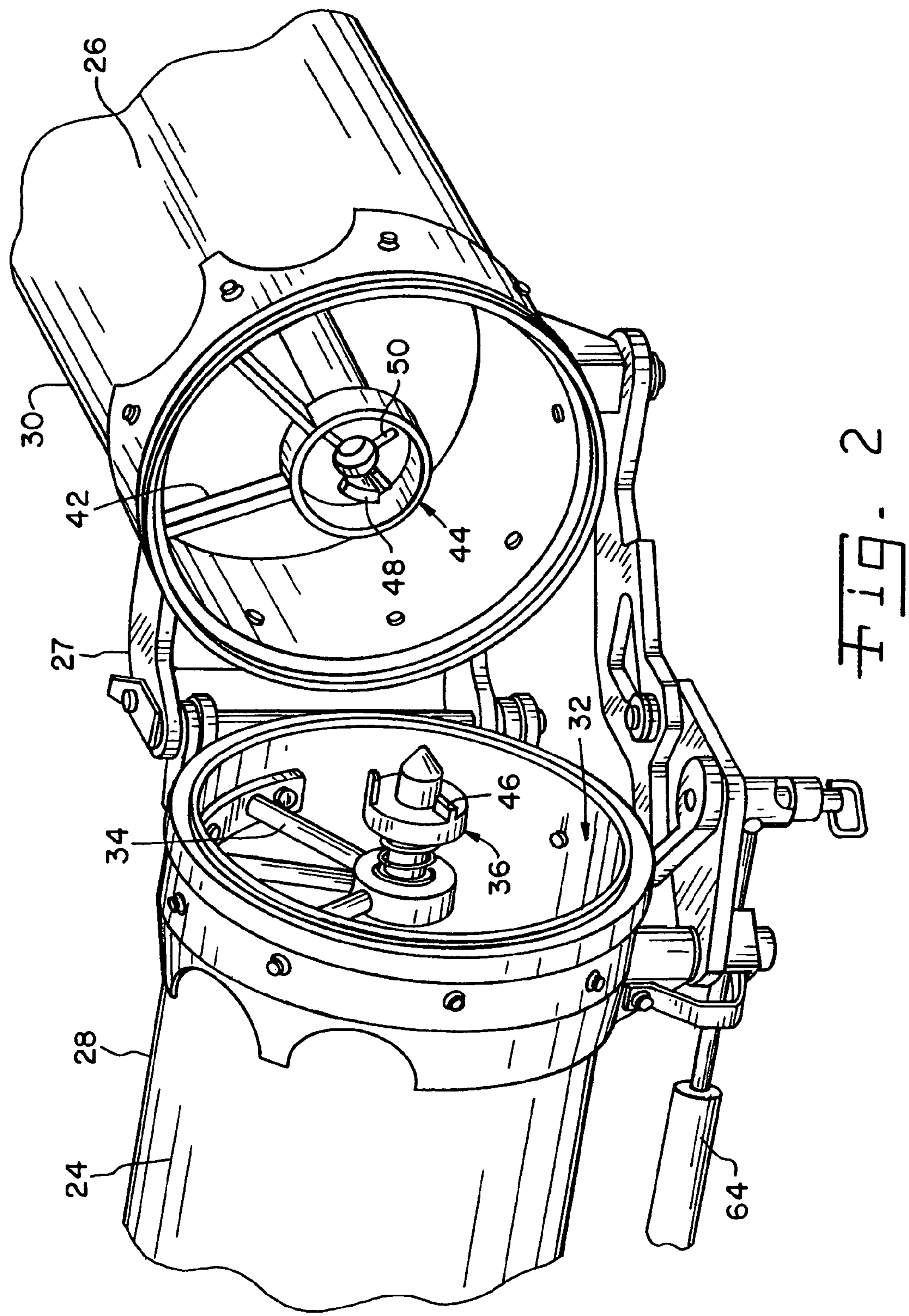
FIG. 2 is a perspective view of the hinge and engagement assembly shown in FIG. 1.
Figure 3:
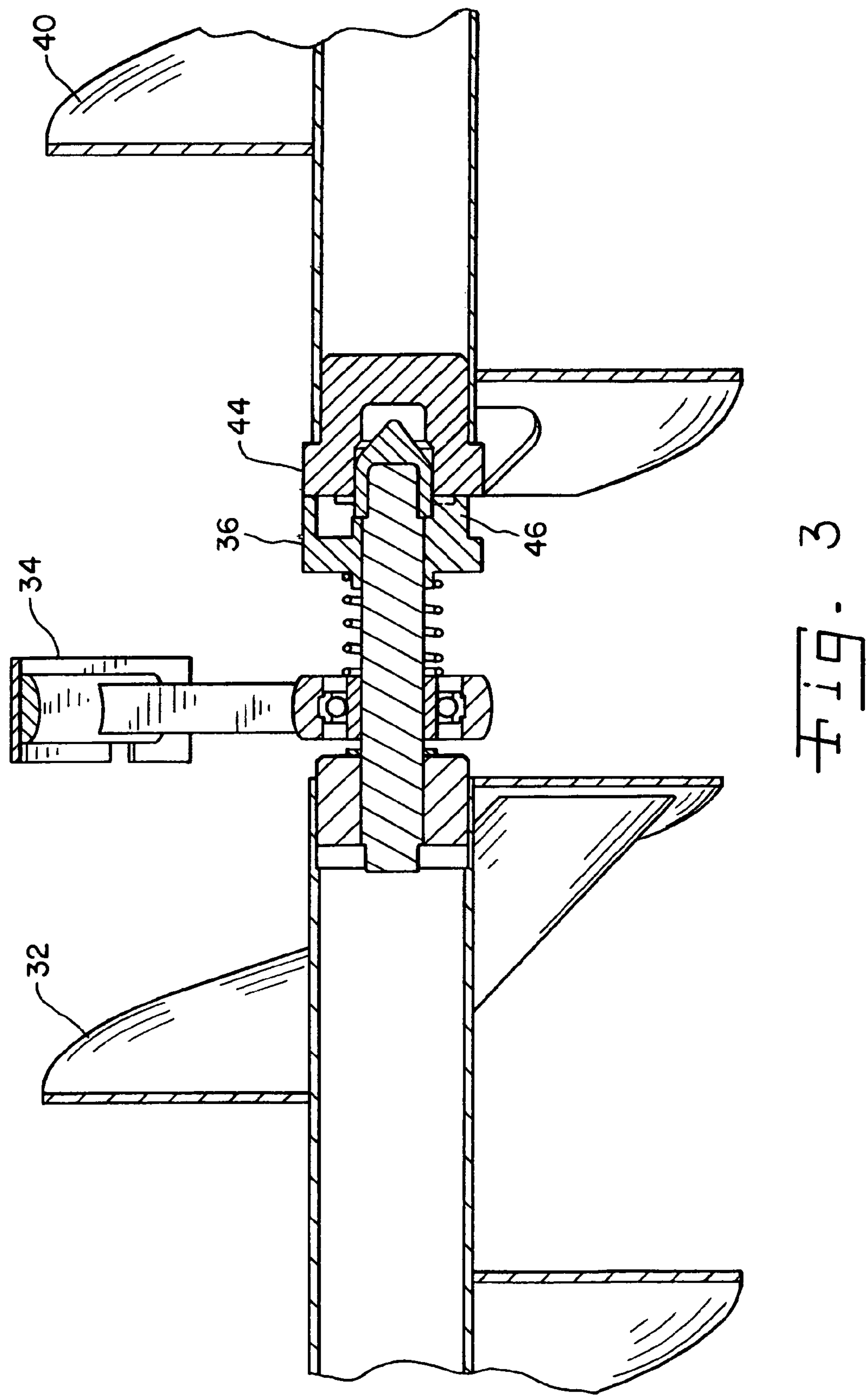
FIG. 3 is a side, sectional view of the hinge and engagement assembly shown in FIG. 2.
Figure 4:
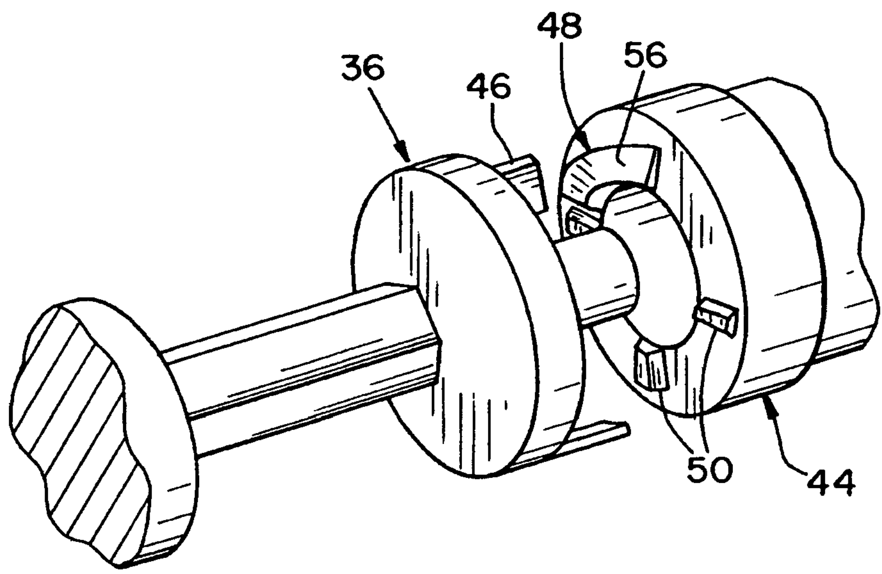
FIG. 4 is a fragmentary, perspective view of the engagement assembly shown in FIGS. 2 and 3.
Figure 5:
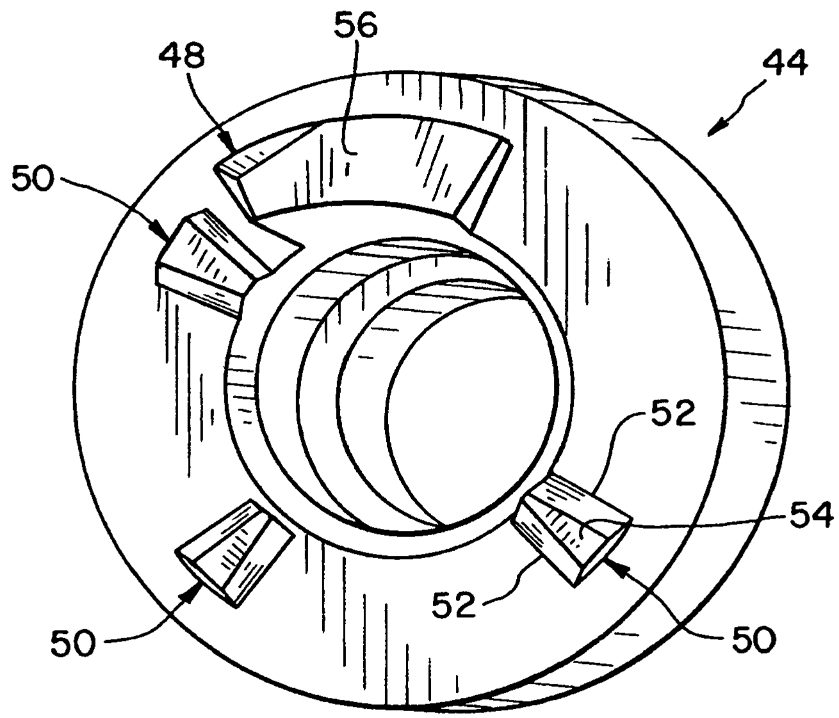
FIG. 5 is a perspective view of the driven side of the engagement assembly.

Referring now to the drawings, and more particularly to FIGS. 1 and 2, there is shown an embodiment of an agricultural harvester 10 in the form of an agricultural combine. Harvester 10 generally includes a body 12, operators cab 14, grain tank 16 and unloading auger 18. Harvester 10 is detachably coupled with a cutting platform or head (not shown) in front of operators cab 14. A crop material is transported from the head into a separator within harvester 10, with the grain being transported into grain tank 16 and the non-grain material being discharged back onto the field using straw chopper 20.

Unloading auger 18 is used to unload clean grain from grain tank 16 to a vehicle, such as a semi trailer, gravity wagon, straight truck, etc. Unloading auger 18 pivots about a generally vertical axis (depending upon the orientation of harvester 10) at input end 22 which receives grain from grain tank 16. Unloading auger 18 is configured as a folding unloading auger including an outer auger 26 which pivots relative to an inner auger 24 about a hinge assembly 27. Inner auger 24 has an outer end 28 which lies adjacent to an inner end 30 of outer auger 26. Inner auger 24 carries a flighting 32 therein, which is held in a generally concentric position within the auger tube by a support structure 34 at outer end 28. A first coupler 36 is also carried by support structure 34, and is axially movable within support structure 34. First coupler 36 is rotatably driven by a flighting 32 (and its center support member) within inner auger 24.

Outer auger 26 includes a discharge end 38 from which the grain is discharged into a vehicle. Outer auger 26 also includes a flighting 40 which is rotatably and concentrically supported within the outer tube by support structure 42 at inner end 30 in the folded position, and supported by inner auger 24 in the unfolded position. A second coupler 44 also supported by support structure 42 rotatably drives the center support tube carrying flighting 40.

First coupler 36 and second coupler 44 together define an engagement assembly for positively engaging and rotatably driving outer auger 26 when moved from the folded position to the unfolded position for unloading. More particularly, first coupler 36 at outer end 28 of inner auger 24 includes a first engagement cog 46. Second coupler 44 similarly includes a second engagement cog 48 at inner end 30 of outer auger 26. First engagement cog 46 positively engages with second engagement cog 48 to in turn positively drive outer auger 26 during an unloading operation.

To avoid a sudden impact occurring between first engagement cog 46 and second engagement cog 48 which may have undesirable effects, second coupler 44 is provided with one or more engagement assistors 50 which are configured to initially rotate outer auger 26 prior to engagement between first engagement cog 46 and second engagement cog 48 (FIGS. 2-5). In the embodiment shown, second coupler 44 includes three engagement assistors 50 which extend outwardly toward first coupler 36. Each engagement assistor 50 has a ramped surface 52 on both the upstream and the downstream side thereof, relative to the direction of rotation of outer auger 26. At the outer end of engagement assistor 50 extending between the ramped surfaces 52 is a generally flat outer surface 54. First engagement cog 46 of first coupler 36 engages an upstream ramped surface 52 on second coupler 44 to begin rotation of outer auger 26. As is apparent in FIG. 5, one of the engagement assistors 50 is located on the upstream side of and closely adjacent to the orthogonal engaging face of second engagement cog 48. The adjacent engagement assistor 50 not only initiates rotation of outer auger 26 when first engagement cog 46 contacts its ramped surface 52, but also serves to maintain first engagement cog 46 in place against second engagement cog 48.

Second engagement cog 48 also includes a ramped surface 56 on a downstream side thereof relative to the direction of rotation of outer auger 26. This ensures that if during an unfolding operation the orientation of first engagement cog 46 overlies second engagement cog 48, first engagement cog 46 will travel down ramp surface 56 for engagement with the next engagement assistor 50.

First engagement cog 46 is positioned generally in rotational alignment with an outer end of flighting 32. Conversely, second engagement cog 48 is positioned generally 180° out of phase with the inner end of flighting 40. This ensures that the outer end of flighting 32 and the inner end of flighting 40 are generally 180° out of phase with each other, which is the preferred orientation for ensuring a constant flow of grain through unloading auger 18 and avoiding unnecessary mechanical loading on components of outer auger 26 caused by the transfer of grain from inner auger 24 to outer auger 26.

During an unloading operation, outer auger 26 is moved to the unfolded position relative to inner auger 24 for unloading of grain. First engagement cog 46 engages with an engagement assistor 50 and initiates rotation of flighting 40 within outer auger 26. First engagement cog 46 is spring loaded against the engagement assistor 50 with a force allowing first engagement cog 46 to engage and then ride over and past the engagement assistor 50. First engagement cog 46 continues to engage and skip over each engagement assistor 50 until contacting second engagement cog 48. The intermittent contact with each engagement assistor 50 begins rotation of flighting 40. Positive engagement between first engagement cog 46 and second engagement cog 48 ensures rotation of flighting 40 within outer auger 26.

Alternatively, it may be possible to spring load first engagement cog 46 against the engagement assistor 50 with a higher force value. Since there is initially no loading on flighting 40 within outer auger 26 (since there is not yet grain in outer auger 26), flighting 40 rotates within outer auger 26. As the grain begins to move from inner auger 24 to outer auger 26, mechanical loading components are experienced on flighting 40, which in turn overcomes the spring force holding first engagement cog 46 and the engagement assistor 50 together, and allows first engagement cog 46 to ride over the remaining engagement assistors 50 until contacting second engagement cog 48.

Having described the preferred embodiment, it will become apparent that various modifications can be made without departing from the scope of the invention as defined in the accompanying claims.

The invention claimed is:

1. An unloading auger for an agricultural harvester, comprising:

an inner auger having an outer end and a first coupler at said outer end, said first coupler including a first engagement cog;

an outer auger pivotally attached to said outer end of said inner auger, said outer auger having an inner end and a second coupler at said inner end, said second coupler including a second engagement cog, one of said first coupler and said second coupler including at least one engagement assistor configured to initiate rotation of said outer auger, when said outer auger is moved to an unfolded position relative to said inner auger, prior to engagement between said first engagement cog and said second engagement cog, wherein each said engagement assistor comprises a ramped surface extending from said second coupler and wherein said inner auger includes a fighting with an outer end, and said outer auger includes a fighting with an inner end, said first engagement cog and said second engagement cog being configured such that said outer end of said inner auger fighting is approximately 180 degrees out of phase with said inner end of said outer auger fighting, and a spring for yieldably urging one of said first and second couplers against the other of said first and second couplers to permit said first engagement cog to ride up and over said engagement assistors to finally engage said second engagement cog.

2. The unloading auger of claim 1, wherein said second coupler on said outer auger includes said at least one engagement assistor.

3. The unloading auger of claim 2, wherein one said engagement assistor is positioned on an upstream side of said second engagement cog, relative to a direction of rotation of said outer auger.

4. The unloading auger of claim 1, wherein said second engagement cog includes a ramped surface on the downstream side thereof relative to a direction of rotation of said outer auger, and each said engagement assistor includes a ramped surface on the upstream side thereof relative to said direction of rotation of said outer auger.

5. The unloading auger of claim 1, wherein each said ramped surface terminates at a generally flat outer surface.

6. The unloading auger of claim 1, wherein said at least one engagement assistor includes a plurality of engagement assistors.

7. The unloading auger of claim 1, wherein said at least one engagement assistor is configured to rotate said outer auger as said engagement assistor is rotatably driven by one of said first engagement cog and said second engagement cog.

8. An agricultural harvester, comprising:

a grain tank; and an unloading auger in communication with said grain tank, said unloading auger including:

an inner auger having an outer end and a first coupler at said outer end, said first coupler including a first engagement cog;

an outer auger pivotally attached to said outer end of said inner auger, said outer auger having an inner end and a second coupler at said inner end, said second coupler including a second engagement cog, one of said first coupler and said second coupler including at least one engagement assistor configured to initiate rotation of said outer auger, when said outer auger is moved to an unfolded position relative to said inner auger, prior to engagement between said first engagement cog and said second engagement cog, wherein each said engagement assistor comprises a ramped surface extending from said second coupler and wherein said inner auger includes a fighting with an outer end, and said outer auger includes a fighting with an inner end, said first engagement cog and said second engagement cog being configured such that said outer end of said inner auger fighting is approximately 180 degrees out of phase with said inner end of said outer auger fighting, and a spring for yieldably urging one of said first and second couplers against the other of said first and second couplers to permit said first engagement cog to ride up and over said engagement assistors to finally engage said second engagement cog.

9. The agricultural harvester of claim 8, wherein said second coupler on said outer auger includes said at least one engagement assistor.

10. The agricultural harvester of claim 9, wherein one said engagement assistor is positioned on an upstream side of said second engagement cog, relative to a direction of rotation of said outer auger.

11. The agricultural harvester of claim 8, wherein said second engagement cog includes a ramped surface on the downstream side thereof relative to a direction of rotation of said outer auger, and each said second engagement assistor includes a ramped surface on the upstream side thereof relative to said direction of rotation of said outer auger.

12. The agricultural harvester of claim 8, wherein each said ramped surface terminates at a generally flat outer surface.

13. The agricultural harvester of claim 8, wherein said at least one engagement assistor includes a plurality of engagement assistors.

14. The agricultural harvester of claim 8, wherein said at least one engagement assistor is configured to rotate said outer auger as said engagement assistor is rotatably driven by one of said first engagement cog and said second engagement cog.

* * * * *

UNITED STATES PATENT AND TRADEMARK OFFICE

CERTIFICATE OF CORRECTION

PATENT NO. : 8,033,377 B2
APPLICATION NO. : 11/271694
DATED : October 11, 2011
INVENTOR(S) : Mark Jeffery Reimer et al.

It is certified that error appears in the above-identified patent and that said Letters Patent is hereby corrected as shown below:

COLUMN 4

At line 26, please delete “fighting”, and substitute therefore --flighting--;
At line 27, please delete “fighting”, and substitute therefore --flighting--;
At line 29, please delete “fighting”, and substitute therefore --flighting--; and
At line 31, please delete “fighting”, and substitute therefore --flighting--.

COLUMN 5

At line 11, please delete “fighting”, and substitute therefore --flighting--;
At line 12, please delete “fighting”, and substitute therefore --flighting--;
At line 15, please delete “fighting”, and substitute therefore --flighting--; and
At line 17, please delete “fighting”, and substitute therefore --flighting--.

Signed and Sealed this
Tenth Day of April, 2012

David J. Kappos
*Director of the United States Patent and Trademark Office*